May 17, 1960 D. W. HARLING 2,937,344
ARRANGEMENTS FOR MODULATING ELECTRIC CARRIER WAVE OSCILLATIONS
Filed March 9, 1955
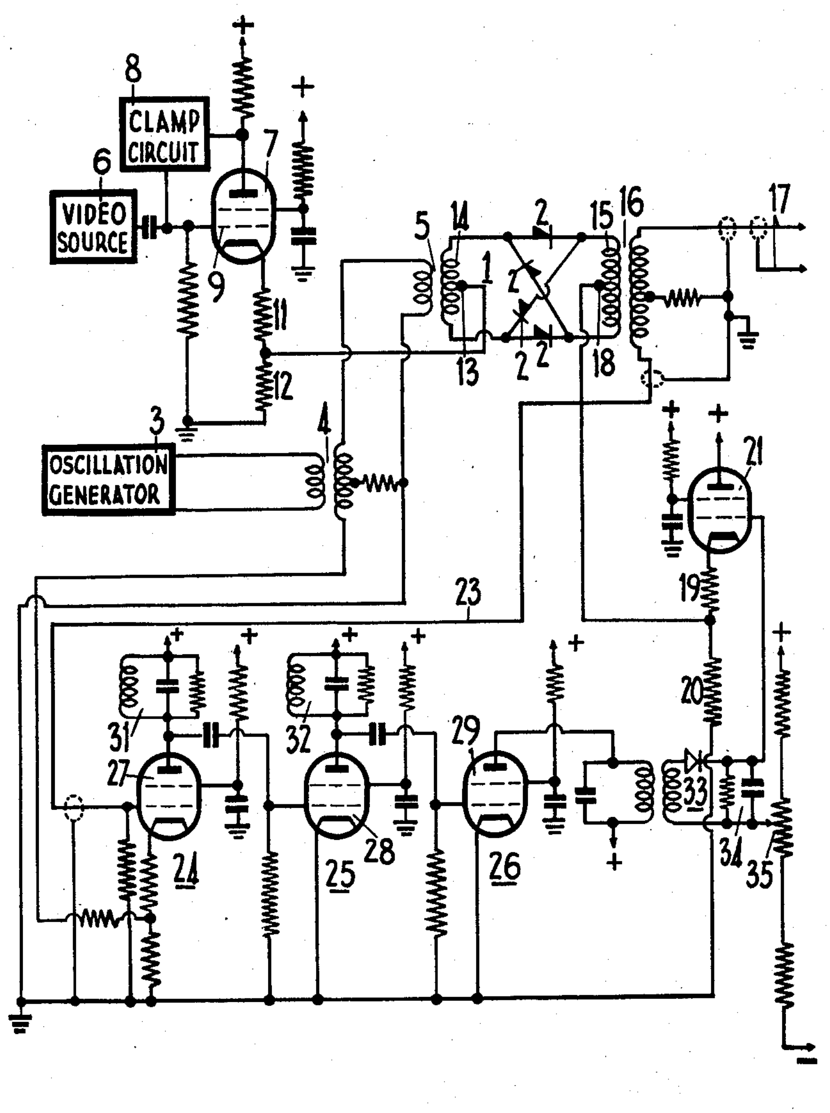
INVENTOR
Denis William Harling
BY
[signature]
ATTORNEY 2,937,344

ARRANGEMENTS FOR MODULATING ELECTRIC CARRIER WAVE OSCILLATIONS

Denis William Harling, North Wembley, England, assignor to The General Electric Company Limited, London, England Application March 9, 1955, Serial No. 493,199

Claims priority, application Great Britain March 11, 1954

9 Claims. (Cl. 332—38)

The present invention relates to arrangements for amplitude modulating electric carrier wave oscillations, and it is an object of the present invention to provide such arrangements in which provision is made for stabilising to a high degree the modulation ratio of the output oscillations.

According to the present invention an arrangement for modulating an electric carrier wave oscillation comprises a path for supplying modulating signals, a carrier wave oscillation generator which is adapted to supply oscillations that are of substantially constant amplitude, an amplitude modulating device to which are applied signals supplied over said path and oscillations supplied by the said carrier wave oscillation generator, an output circuit which is coupled to said modulating device and to which in operation the modulating device supplies amplitude modulated oscillations, and a feedback path coupled between the output circuit and the modulating device, the feedback path being arranged to derive a potential depending upon the peak amplitude of the modulated oscillations in the output circuit and to apply said potential to the modulating device to control the depth of modulation effected thereby in such a sense that any change in the modulation ratio of the modulated oscillation from a predetermined value is opposed.

The modulating device may be a bridge modulator circuit comprising four equal arms each containing a rectifier. Thus the rectifiers may be arranged so that like electrodes are connected together at each of one pair of opposite corners of the bridge and unlike electrodes are connected at each of the other pair of opposite corners of the bridge, an output from the carrier wave oscillation generator being coupled across the said one pair of opposite corners of the bridge and the arrangement being such that the modulating signals are supplied across said other pair of opposite corners of the bridge through a cathode follower stage, at least part of the cathode load of which is connected in series with an output from the feedback path across the said other pair of opposite corners of the bridge and the output circuit also being coupled across the said other pair of opposite corners of the bridge. Alternatively the modulating device may be a ring modulator, the arrangement being such that modulating signals are supplied to the modulating device in series with the said potential derived by the feedback path.

Preferably the output stage of the feedback path is provided by a cathode follower stage, the output from the feedback path being taken from across at least part of the cathode load of this cathode follower stage. This cathode follower stage preferably includes or is associated with means for adjusting the current flowing in the cathode load in the absence of an output from the modulating device, the magnitude of this current determining the predetermined value of the modulation ratio.

The feedback path may comprise an amplifier coupled to the output circuit, a peak detector coupled to the output of the amplifier and a low pass filter network for feeding the output of the detector to the output stage of the path, which stage as stated above may be the further cathode follower stage.

A portion of the output from the carrier wave oscillation generator may be applied to the amplifier in the feedback path in addition to the oscillations from the output circuit, in order to decrease the modulation ratio of the oscillations supplied through the amplifier to the peak detector.

One arrangement in accordance with the present invention for modulating electric carrier wave oscillations will now be described by way of example with reference to the accompanying drawing which shows diagrammatically the circuit of the arrangement.

If a carrier wave oscillation of frequency $f_c$ is modulated by a single sinusoidal oscillation of frequency $f_s$, the instantaneous amplitude of the modulated oscillation at any given time $t$ is given by the equation:

$$a=a_0(1+m \sin 2\pi f_s t) \sin 2\pi f_c t$$

where $a_0$ is the amplitude of the unmodulated carrier oscillation and $m$ is the modulation ratio of the modulated oscillations. The arrangement now to be described is adapted to effect modulation with a modulation ratio in excess of 1.0.

Referring now to the drawing, the arrangement comprises a rectifier bridge modulator circuit 1 comprising four equal arms each containing a single germanium crystal rectifier 2. The rectifiers 2 are connected so that the modulator is, in fact, a ring modulator. Germanium crystal rectifiers are particularly suitable in this application, since they generally have very low reactive components of their impedance.

An output from a carrier wave oscillation generator 3 of frequency 10 mc./s. is supplied through a hybrid transformer 4 and another transformer 5 across one pair of opposite corners of the bridge 1. The oscillation generator 3 includes conventional means (not shown) for stabilising the amplitude of the output oscillations in operation, so that the amplitude of the carrier wave oscillation applied across the bridge modulator circuit 1 is constant within 5% throughout operation.

The modulating signal is supplied by the video source 6 and has the waveform at present transmitted by the British Broadcasting Corporation so that, in addition to the video information, the signal is periodically pulsed a predetermined amount below the signal level corresponding to black, that is to say in the direction away from the signal level corresponding to white, for the purpose of providing line and frame synchronising signals. The signal supplied by the source 6 is fed to the control grid circuit of a thermionic valve 7 which is arranged to operate as a cathode follower stage, the sense of the signal being such that the synchronising pulses are positive peaks in the signal. A conventional D.C. level restoration circuit 8 is provided in order to control the D.C. level of the modulating signal applied to the control grid 9 of the valve 7, by clamping either the positive peaks or the black level of the signal to a predetermined voltage.

Two resistors 11 and 12 are connected in series in the cathode circuit of the valve 7 and the junction of these two resistors is connected to the centre tapping 13 of the secondary winding 14 of the transformer 5. The modulated oscillations passed by the modulator circuit 1 are fed to the primary winding 15 of a hybrid transformer 16 which is arranged to supply the two-wire output circuit 17. The centre tapping 18 of the primary winding 15 is connected to the junction of two resistors 19 and 20 that are connected in series in the cathode circuit of a valve 21. Thus, as far as the modulator circuit 1 is concerned, the voltage developed across the resistor 20 due to current through the valve 21 tends to oppose that developed across the resistor 12.

The modulated oscillations supplied by the output circuit 17 may be passed to a band pass filter which is arranged to select one sideband of the modulated oscillations applied to it together with a vestigial part of the other sideband. The output from the band pass filter may then be applied to a network having a frequency/amplitude response such as to reduce the amplitude of the components applied to it having frequencies near the carrier wave frequency, and then to a final output amplifier before application to a coaxial cable transmisison system, the received oscillations may be passed through a network having a frequency/amplitude response, which is the inverse of the response of the network at the transmitter, to a demodulating stage in which the phase of the oscillations of the carrier wave frequency is maintained by an external circuit within a few degrees of the phase of the component of carrier wave frequency in the received oscillations. By this arrangement quadrature distortion is maintained at a tolerably low level.

Returning to the description of the modulating arrangement at the transmitter, a portion of the modulated oscillations from the bridge modulator circuit 1 are also applied through the hybrid transformer 16 to a path 23. The signal supplied over the path 23 is fed to three amplifier stages 24, 25 and 26 that are connected in cascade. The amplifier stages 24, 25 and 26 are formed by tetrode valves 27, 28 and 29 respectively. Parallel tuned circuits 31 and 32 are provided in the anode circuits of the valves 27 and 28, the circuits 31 and 32 having medium values of "Q" and being tuned to the frequency of the generator 3 so that the amplifier stages 24 and 25 amplify the component oscillations supplied thereto having the carrier frequency to a greater extent than the side bands. The signal passed by the amplifier stage 26 is fed to a peak detector circuit 33 which is arranged to derive a variable D.C. potential determined by the peak amplitude of the modulated oscillations. The output potential from the peak detector circuit 33 is applied through a low pass filter network 34 to the input of the valve 21. It will be appreciated that this potential is a measure of the level of the modulated oscillations during the synchronising pulses of the modulating signal, that is to say when the depth of modulation is a maximum. One side of the low pass filter network 34 is connected to a variable tapping 35 on a D.C. potentiometer chain, so that the current in the valve 21 in the absence of an output from the bridge modulator circuit 1 may be adjusted by adjusting the position of the tapping 35 on the potentiometer chain.

If a very high modulation ratio is employed, there is a danger that the negative peaks of the modulating signal will cause the amplitude of the modulated oscillations to approach or exceed the same value as that corresponding to the positive peaks of the modulating signal. In this case the operation of the peak detector circuit 33 in the arrangement so far described might become unstable. The frequency response of the amplifier stages 24 and 25 tends to reduce this possibility but, in addition, a portion of the output of the oscillation generator 3 is obtained from the hybrid transformer 4 and injected into the cathode circuit of the valve 27 in the correct phase to reduce the modulation ratio of the modulated oscillations applied to the detector circuit 33. Thus, when the depth of modulation of the oscillations applied to the output circuit 17 is a maximum, the oscillations applied to the detector circuit 33 may, for example, have a modulation ratio of the order of unity.

The arrangement described above operates as follows. Assuming for the moment that no potential of any sort appears across the resistors 12 and 20, the bridge circuit 1 is balanced, assuming also that the rectifiers 2 are all identical, and therefore no oscillation of the carrier wave frequency will be supplied to the transformer 16. If however a suitable D.C. potential is applied between the points 13 and 18, for example as a resultant of the standing potentials appearing across the resistors 12 and 20, the bridge 1 becomes unbalanced and oscillations of carrier frequency are supplied to the transformer 16. The amplitude of these oscillations will depend on the degree of unbalance of the bridge 1, and, if the rectifiers 2 are working on the non-linear parts of their conducting characteristics, the degree of unbalance will vary with the magnitude of the voltage applied. If now a signal voltage, for example that passed by the valve 7, is superimposed upon the D.C. potential applied between the points 13 and 18, the oscillations supplied by the bridge 1 will be modulated in amplitude in dependence upon the signal voltage. By suitably determining the magnitude of this D.C. potential across the bridge 1, in relation to the amplitude of the signal voltage, the modulation ratio of the amplitude modulated oscillations thus generated can be determined, since the magnitude of the D.C. potential determines the amplitude of the carrier oscillation in the absence of a modulating signal.

In fact the operating conditions of the valve 7 are arranged so that the D.C. potential appearing across the resistor 12 is rather greater than that required between the points 13 and 18. Then, by adjusting the potentiometer tapping 35, the standing current in the valve 21 is set so that, in the absence of modulating signals, the D.C. potential appearing across the resistor 20 reduces the total D.C. potential to the magnitude required to give the desired unmodulated carrier wave oscillation amplitude in the output circuit.

When modulating signals are applied, the peak detector circuit 33 derives a potential, as previously mentioned, dependent upon the peak amplitude of the output modulated oscillations, and it is arranged that, if the peak potential departs from a predetermined value, the output from the peak detector circuit 33, which is applied to the valve 21, varies the current flowing in the valve 21 and hence the potential appearing across the resistor 20, in such a way as to oppose the change in the said peak potential. Thus the feedback operates to stabilise the modulation ratio of the output oscillations. In addition, in order to complete the stability of the arrangement the amplitude of the output from the carrier oscillation generator 3 is stabilised in known manner as previously mentioned. The hybrid transformer 4 serves to ensure that the amplitude of the portion of the output from the oscillation generator 3 that is fed to the amplifier stage 24 is substantially independent of the impedance presented by the bridge circuit 1 to the transformer 4.

It will be appreciated that in addition to the advantages of the stability provided by the feedback, and the stabilising of the magnitude of the output from the oscillation generator 3, the arrangement described above by way of example has a modulator which by its nature, is very stable in operation and economical in components. In addition any unbalance, which may be introduced by variations in the characteristics of the rectifiers 2, will be almost entirely resistive, particularly in the case of germanium crystal rectifiers, and will result in a leakage of carrier wave oscillations either in phase or in anti-phase with the component of carrier wave frequency in the output, and the leakage component will therefore merely add or subtract from the amplitude of that component, without affecting its phase. This is dependent of course on the rectifiers 2 being selected so that they have low reactive components of impedance, which is certainly not difficult to do in the case of germanium crystal rectifiers.

At the same time the modulation ratio may be adjusted simply by adjusting the setting of the tapping 35 on the potentiometer chain, which controls the standing current flowing in the valve 21. A further advantage is that the two thermionic valves 7 and 21 are both used in cathode follower stages, which have an inherent stability, and, since the valves operate effectively in opposition to one another, any effects due to their common variations in their conditions, for example due to ageing, will tend to cancel one another.

When employing the high modulation ratios in excess of 1.0, a temporary major increase in the video signal level would have a serious effect on the nature of the output signal, and it is therefore necessary that the maximum amplitude of the signal applied to the modulator circuit should be limited in case the video signal level should increase for any reason. In the arrangement described this limiting is provided by the inherent limiting characteristics of the cathode follower stage formed by the valve 7.

It will be appreciated that although, in the example described above, a ring modulator is used, this is not essential to the invention. Thus the bridge modulator circuit 1 may be a so-called "Cowan" modulator in which the four rectifiers are connected so that like electrodes are connected together at each of one pair of opposite corners of the bridge while unlike electrodes are connected together at each of the other pair of opposite corners of the bridge. Such a bridge modulator circuit may be in either series or parallel relationship with the output circuit 17.

I claim:

1. An arrangement for modulating an electric carrier wave oscillation comprising a balanced amplitude modulating device, a carrier wave oscillation generator which is adapted to supply oscillations that are of substantially constant amplitude to the modulating device, a first cathode follower stage having an input and an output, a path for supplying modulating signals to said input of said first cathode follower stage, an output circuit which is coupled to the modulating device to receive, in operation, amplitude modulated oscillations therefrom, a second cathode follower stage having an input and an output, a feedback path coupled to said output circuit for deriving a potential dependent upon the peak amplitude of amplitude modulated oscillations in that output circuit and for applying that potential to said input of said second cathode follower stage, means for applying signals appearing at said output of said first cathode follower stage and at said output of said second cathode follower stage, in opposition, to the modulating device to amplitude modulate the carrier wave oscillation applied thereto and to determine the depth of modulation effected thereby.

2. An arrangement for modulating an electric carrier wave oscillation, said arrangement comprising means for supplying modulating signals, a carrier wave oscillation generator for supplying oscillations that are of substantially constant amplitude, an amplitude modulating device, circuit means for applying to said amplitude modulating device modulating signals supplied by the first named means and oscillations supplied by said generator, an output circuit coupled to said modulating device and receiving amplitude modulated oscillations from said device, and a feedback path coupled between the output circuit and the modulating device and arranged to derive a potential depending both upon the peak amplitude of the modulated oscillations in the output circuit and the amplitude of the carrier wave oscillations as applied to the modulating device, and to apply said potential to the modulating device to control the depth of modulation effected thereby in such a sense that any change from a predetermined value in the modulation ratio of the modulated oscillations is opposed.

3. An arrangement according to claim 2 wherein the modulating device is a bridge modulator circuit comprising four equal arms each containing a rectifier.

4. An arrangement according to claim 3 wherein the modulating device is a ring modulator, the arrangement being such that modulating signals are supplied to the modulating device in series with the said potential derived by the feedback path.

5. An arrangement according to claim 4 wherein a cathode follower stage is arranged to supply the modulating signals to the modulating device and there is means to control the direct current level of the modulating signals supplied to the cathode follower stage.

6. An arrangement according to claim 2 wherein the output stage of the feedback path is provided by a cathode follower stage, the output from the feedback path being taken from across at least part of the cathode load of this cathode follower stage.

7. An arrangement according to claim 6 wherein the cathode follower stage which constitutes the output stage of the feedback path includes means for adjusting the current flowing in the cathode load in the absence of an output from the modulating device, the magnitude of this current determining the predetermined value of the modulation ratio.

8. An arrangement according to claim 2 wherein the feedback path comprsies an amplifier coupled to the output circuit, a peak detector coupled to the output of the amplifier and a low-pass filter for feeding the output of the detector to the output stage of the path.

9. An arrangement according to claim 8 wherein a portion of the output from the carrier wave oscillation generator is applied to the said amplifier in the feedback path in addition to the oscillations from the output circuit, in order to decrease the modulation ratio of the oscillations supplied through the amplifier to the peak detector.

References Cited in the file of this patent

UNITED STATES PATENTS

| | | |
|---|---|---|
| 2,025,158 | Cowan | Dec. 24, 1935 |
| 2,103,090 | Plebanski | Dec. 21, 1937 |
| 2,292,869 | Dillenburger | Aug. 11, 1942 |
| 2,298,930 | Decino | Oct. 13, 1942 |
| 2,494,830 | Peterson | Jan. 17, 1950 |
| 2,541,060 | Hester et al. | Feb. 13, 1951 |
| 2,682,640 | Harling | June 29, 1954 |

FOREIGN PATENTS

| | | |
|---|---|---|
| 493,050 | Great Britain | Sept. 30, 1938 |
| 70,088 | Netherlands | June 16, 1952 |